(12) United States Patent
Grundström et al.

(10) Patent No.: US 6,628,781 B1
(45) Date of Patent: Sep. 30, 2003

(54) METHODS AND APPARATUS FOR IMPROVED SUB-BAND ADAPTIVE FILTERING IN ECHO CANCELLATION SYSTEMS

(75) Inventors: Patrik Grundström, Malmo (SE); Fredrik Ehrenstråle, Malmo (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/324,851

(22) Filed: Jun. 3, 1999

(51) Int. Cl.[7] .................. H04M 1/00; H04M 9/00; H04M 9/08

(52) U.S. Cl. .................. 379/406.14; 379/406.08; 379/406.12

(58) Field of Search ........ 379/406.01–406.16, 379/387.01–392.07

(56) References Cited

U.S. PATENT DOCUMENTS

| | | |
|---|---|---|
| 4,956,838 A | 9/1990 | Gilloire et al. |
| 5,436,940 A | 7/1995 | Nguyen |
| 5,610,944 A | 3/1997 | Mau et al. |

FOREIGN PATENT DOCUMENTS

| | | |
|---|---|---|
| EP | 0443547 A2 | 8/1991 |
| EP | 0709958 A1 | 5/1996 |
| WO | WO96/28895 | 9/1996 |

OTHER PUBLICATIONS

A. Gilloire, M. Vetterii, *Adaptive Filtering in Subbands with Critical Sampling: Analysis, Experiments, and Application to Acoustic Echo Cancellation*, IEEE Transactions on Signal Processing, vol. 40, N. 8, Aug. 1992, pp. 1862–1875.

P. DeLeon, D. Etter, *Experimental Results with Increased Bandwidth Analysis Filters in Oversampled, Subband Acoustic Echo Cancelers*, IEEE Signal Processing Letters, vol. 2, No. 1, Jan. 1995, pp. 1–3.

M. Tahernezhadi et al., "An Improved Subband Acoustic Echo Canceller for Teleconferencing Applications," Proceedings of the Midwest Symposium on Circuits and Systems, U.S., New York, IEEE, vol. Symp. 37, 1994, pp. 1424–1427.

*Primary Examiner*—Duc Nguyen
(74) *Attorney, Agent, or Firm*—Burns, Doane, Swecker & Mathis, L.L.P.

(57) ABSTRACT

In methods and apparatus for echo cancellation using sub-band adaptive filtering, the bandwidth of each of a number of sub-band analysis filters, as well as the bandwidth of each of a number of synthesis filters, is increased as compared to a corresponding bandwidth in a conventional system. More specifically, the −3 dB bandwidths of adjacent filters in an analysis or synthesis filter bank according to the invention are designed to overlap one another. For example, each of M (an integer) sub-band filters in an analysis or synthesis filter bank according to the invention can include a −3 dB bandwidth somewhat greater than 1/M times a total bandwidth of interest. The increase in bandwidth tends to cancel aliasing effects resulting from sub-band down-sampling, and an echo canceling device according to the invention can therefore provide superior output signal reconstruction as compared to conventional devices.

24 Claims, 4 Drawing Sheets

METHODS AND APPARATUS FOR IMPROVED SUB-BAND ADAPTIVE FILTERING IN ECHO CANCELLATION SYSTEMS

FIELD OF THE INVENTION

The present invention relates to communications systems, and more particularly, to echo suppression in bi-directional communications systems.

BACKGROUND OF THE INVENTION

Adaptive filtering arrangements are prevalent in communications systems of today. Such arrangements are typically used to reduce or remove unwanted signal components and/or to control or enhance signal components of interest.

A common example of such a filtering arrangement relates to hands-free telephony, wherein the built-in earphone and microphone of a conventional telephone handset are replaced with an external loudspeaker and an external microphone, respectively, so that the telephone user can converse without having to physically hold the telephone unit in hand. Since sound emanating from the external loudspeaker can be picked up by the external microphone, adaptive filtering is commonly performed in order to prevent the loudspeaker output from echoing back and annoying the far-end user at the other end of the conversation. This type of adaptive filtering, or echo canceling, has become a basic feature of the full-duplex, hands-free communications devices of today.

Typically, echo cancelation is achieved by passing the loudspeaker signal through an adaptive Finite Impulse Response (FIR) filter which approximates, or models, the acoustic echo path between the hands-free loudspeaker and the hands-free microphone (e.g., a passenger cabin in an automobile hands-free telephony application). The FIR filter thus provides an echo estimate which can be removed from the microphone output signal prior to transmission to the far-end user. The filtering characteristic (i.e., the set of FIR coefficients) of the adaptive FIR filter is dynamically and continuously adjusted, based on both the loudspeaker input and the echo-canceled microphone output, to provide a close approximation to the echo path and to track changes in the echo path (e.g., when a near-end user of an automobile hands-free telephone shifts position within the passenger cabin).

Adjustment of the filtering characteristic is commonly achieved using a form of the well known Least Mean Square (LMS) adaptation algorithm developed by Widrow and Hoff in 1960. The LMS algorithm is a least square stochastic gradient step method which, as it is both efficient and robust, is often used in many real-time applications. The LMS algorithm and its well known variations (e.g., the Normalized LMS, or NLMS algorithm) do have certain drawbacks, however. For example, the LMS and other known algorithms can sometimes be slow to converge (i.e., approach the target filtering characteristic, such as the acoustic echo path in a hands-free telephony application), particularly when the algorithm is adapted, or trained, based on a non-white, or colored, input signal such as a human speech signal. Moreover, the order of the FIR filter (i.e., the number of filter taps) can be quite high in the context of acoustic echo cancelation, and implementation of the adaptive filtering algorithm can therefore be computationally complex.

Consequently, recent work has focused on performing the adaptive filtering in sub-bands. In other words, filter banks are used to divide both the microphone signal and the loudspeaker signal into a number of frequency sub-bands. Each sub-band signal is then decimated, or down-sampled, and adaptive filtering is performed in each sub-band to provide a number of echo-canceled sub-band output signals. The resulting sub-band output signals are then expanded, or up-sampled, and combined to reconstruct the overall echo-canceled microphone signal for transmission to the far-end user. Advantageously, the sub-sampling results in greater computational efficiency as compared to the full-band processing approach and, since variations in the spectral content of the input signals are less severe within each sub-band, overall convergence speed is also improved.

However, known sub-band adaptive filtering systems suffer from certain disadvantages as well. For example, signal aliasing between sub-bands can result in slow overall convergence and/or errors in the reconstructed microphone signal. Consequently, there is a need for improved methods and apparatus for performing sub-band adaptive filtering in echo suppression systems.

SUMMARY OF THE INVENTION

The present invention fulfills the above-described and other needs by providing sub-band adaptive filtering techniques wherein the bandwidth of each of a number of sub-band analysis filters (i.e., bandpass filters used to divide an echo-containing signal and/or an echo causing signal into a number of adjacent frequency sub-bands), as well as the bandwidth of each of a number of synthesis filters (i.e., bandpass filters used in reconstructing a full-band echo-canceled signal from a number of sub-band echo canceled signals), is increased as compared to a corresponding bandwidth in a conventional system. More specifically, −3 dB bandwidths of adjacent filters in an analysis or synthesis filter bank according to the invention are designed to overlap one another. For example, whereas each of M sub-band filters in certain conventional analysis and synthesis filter banks includes a −3 dB bandwidth of 1/M times the total bandwidth of interest (M an integer), each of M sub-band filters in an analysis or synthesis filter bank according to the invention can include a −3 dB bandwidth which is somewhat greater than 1/M times the total bandwidth of interest. Advantageously, the increase in bandwidth tends to cancel aliasing effects resulting from down-sampling, and a sub-band adaptive filtering device according to the invention can therefore provide superior output signal reconstruction as compared to conventional sub-band adaptive filtering devices.

An exemplary communications device according to the invention includes an adaptive echo canceler receiving a near-end audio signal and a far-end audio signal and providing an echo-canceled near-end audio signal for transmission to a far-end user via the communications channel. The adaptive echo canceler includes a first bank of analysis filters for filtering the near-end audio signal, a second bank of analysis filters for filtering the far-end audio signal, and a bank of synthesis filters for filtering sub-band echo-canceled signals generated within the adaptive echo canceler.

According to the invention, a −3 dB bandwidth of a first of the synthesis filters and a −3 dB bandwidth of a second of the synthesis filters overlap in frequency. For example, the adaptive echo canceler can include an integer number M of synthesis filters, wherein −3 dB bandwidths of the M synthesis filters collectively span an overall bandwidth B, wherein a −3 dB bandwidth of one of the synthesis filters is centered at each one of M frequencies (the M frequencies being distributed across the bandwidth B at intervals of B/M), and wherein the −3 dB bandwidth of each of the synthesis filters is greater than B/M and less than 2B/M.

Additionally, a −3 dB bandwidth of a first analysis filter in the first bank of analysis filters and a −3 dB bandwidth of a second analysis filter in the first bank of analysis filters can overlap in frequency, and a −3 dB bandwidth of a first analysis filter in the second bank of analysis filters and a −3 dB bandwidth of a second analysis filter in the second bank of analysis filters can also overlap in frequency. For example, each of the first and second banks of analysis filters can include an integer number M of analysis filters, wherein −3 dB bandwidths of the M analysis filters in each bank of analysis filters collectively span an overall bandwidth B, wherein a −3 dB bandwidth of one analysis filter in each bank of analysis filters is centered at each one of M frequencies (the M frequencies being distributed across the overall bandwidth at intervals of B/M), and wherein the −3 dB bandwidth of each analysis filter is greater than B/M and less than 2B/M.

The above-described and other features and advantages of the invention are explained in detail hereinafter with reference to the illustrative examples shown in the accompanying drawings. Those of skill in the art will appreciate that the described embodiments are provided for purposes of illustration and understanding and that numerous equivalent embodiments are contemplated herein.

DETAILED DESCRIPTION OF THE INVENTION

Figure 1:
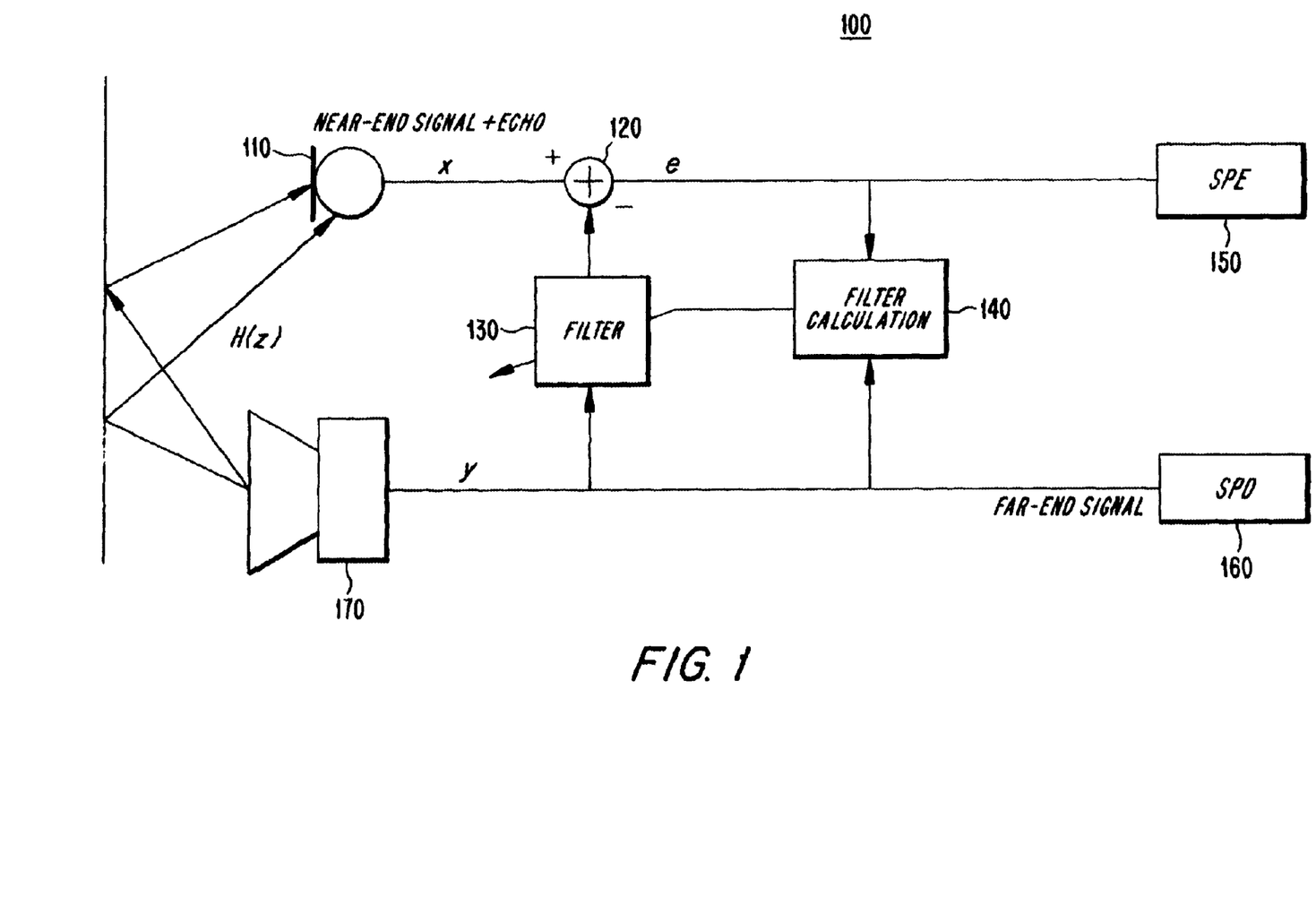
FIG. 1 is a block diagram of an exemplary hands-free telephony system in which the adaptive filtering techniques of the invention can be implemented.

FIG. 1 depicts an exemplary handsfree telephony system 100. As shown, the exemplary system 100 includes a microphone 110, a summing device 120, an adaptive filter 130, a filter computation processor 140, a speech encoder 150, a speech decoder 160, and a loudspeaker 170. Those of ordinary skill in the art will appreciate that the below described functionality of the components of FIG. 1 can be implemented using a variety of known hardware configurations, including a general purpose digital computer, standard digital signal processing components, and/or one or more application-specific integrated circuits (ASICs). Those of ordinary skill will also appreciate that, in practice, the exemplary system 100 includes components (e.g., an analog-to-digital converter at the output of the microphone 110 and a digital-to-analog converter at the input to the loudspeaker 170) which are omitted from FIG. 1, as they are not critical to an understanding of the present invention.

In FIG. 1, an audio output of the microphone 110 is coupled to an additive input of the summing device 120, and an output of the summing device 120 is coupled to an input of the speech encoder 150 and to an input of the filter computation processor 140. Additionally, an output of the speech decoder 160 is coupled to a second input of the filter computation processor 140 and to an input of each of the adaptive filter 130 and the loudspeaker 170. An output of the filter computation processor 140 is coupled to a control input of the adaptive filter 130, and an output of the adaptive filter 130 is coupled to a subtractive input of the summing device 120.

In operation, a coded far-end audio signal, including speech of a far-end user (not shown), is decoded via the decoder 160 and input to the loudspeaker 170 for presentation to a near-end user (also not shown). The loudspeaker output is then echoed back to the microphone 110 via an unknown and sometimes changing echo path, as is indicated by a variable transfer function H(z) in FIG. 1. Thus, audio output from the microphone 110 includes loudspeaker echo, as well as near-end user speech and near-end background noise.

To prevent the loudspeaker echo from reaching and annoying the far-end user, the FIR filter 130 filters the loudspeaker signal to provide an estimate of the loudspeaker echo received at the microphone 110. The resulting echo estimate is then subtracted from the microphone output via the summing device 120, and echo-canceled output from the summing device 120 is encoded and transmitted to the far-end user. At the same time, the echo-canceled output is fed back to the filter computation processor 140 for use in adapting the filter coefficients, or taps, of the FIR filter 130 such that they converge toward and track the true echo path H(z). As is well known in the art, filter coefficient updates are based on both the echo-canceled output, or error, signal and the loudspeaker input, or reference, signal (e.g., using an LMS or NLMS algorithm). As is also well known in the art, coefficient updates can be computed either on a sample by sample basis or on a sample block by sample block basis.

In conventional systems, full-band adaptive filter processing is implemented, and a single FIR impulse response is used to model the acoustic echo path H(z). In other words, the FIR filter 130 in such systems is truly a single FIR filter, and the full-band microphone and loudspeaker signals, as well as the full-band error signal, are used directly in the adaptive algorithm. However, as is described in the above Background of the Invention, such full-band adaptive processing can result in relatively slow convergence of the impulse response, and the relatively high order of the single full-band impulse response can result in significant computational complexity. Thus, as is also described in the above Background of the Invention, the adaptive filtering process is sometimes divided among a plurality of sub-bands.

Figure 2:
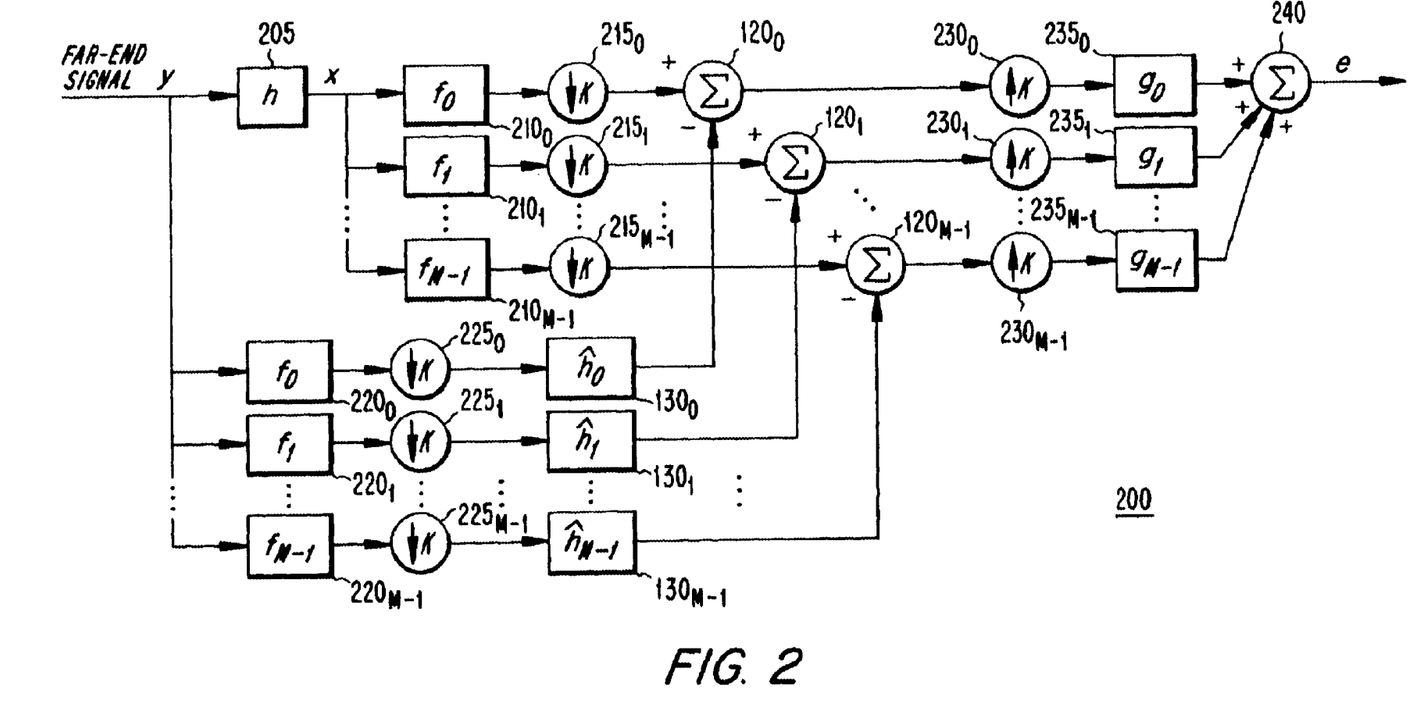
FIG. 2 is a block diagram of an exemplary sub-band adaptive filtering arrangement according to the invention.

FIG. 2 depicts an exemplary sub-band adaptive filtering arrangement 200. The arrangement 200 can, for example, be used to provide the functionality of the summing device 120, the adaptive filter 130 and the filter calculation processor 140 of FIG. 1. As shown, the sub-band arrangement 200 includes a first bank of analysis filters $210_0$–$210_{M-1}$, a first bank of decimators $215_0$–$215_{M-1}$, a bank of sub-band summing devices $120_0$–$120_{M-1}$, a second bank of analysis filters $220_0$–$220_{M-1}$, a second bank of decimators $225_0$–$225_{M-1}$, a bank of adaptive FIR filters $130_0$–$130_{M-1}$, a bank of expanders $230_0$–$230_{M-1}$, a bank of synthesis filters $235_0$–$235_{M-1}$, and a reconstruction summing device 240. As with FIG. 1, those of ordinary skill in the art will appreciate that the components of FIG. 2 can be implemented using a variety of known hardware configurations, including a general purpose digital computer, standard digital signal processing components, and one or more application integrated circuits.

In FIG. 2, a reference signal (e.g., the far-end speech signal of FIG. 1) is passed through an echo path 205 (e.g., the near-end environment of FIG. 1) and is input to each of the second bank of analysis filters $220_0$–$220_{M-1}$. Additionally, output of the echo path 205 (e.g., the microphone signal of FIG. 1) is input to each of the first bank of analysis filters $210_0$–$210_{M-1}$. An output of each of the first bank of analysis filters $210_0$–$210_{M-1}$ is coupled to an input of a respective one of the first bank of decimators $215_0$–$215_{M-1}$, and an output of each of the second bank of analysis filters $220_0$–$220_{M-1}$ is coupled to an input of a respective one of the second bank of decimators $225_0$–$225_{M-1}$.

An output of each one of the first bank of decimators $215_0$–$215_{M-1}$ is coupled to an additive input of a respective one of the bank of sub-band summing devices $120_0$–$120_{M-1}$, and an output of each one of the second bank of decimators $225_0$–$225_{M-1}$ is coupled to an input of a respective one of the sub-band adaptive filters $130_0$–$130_{M-1}$ Additionally, an output of each of the sub-band adaptive filters $130_0$–$130_{M-1}$ is coupled to a subtractive input of a respective one of the sub-band summing devices $120_0$–$120_{M-1}$, and an output of each one of the sub-band summing devices $120_0$–$120_{M-1}$ is coupled to an input of a respective one of the bank of expanders $230_0$–$230_{M-1}$.

An output of each of the expanders $230_0$–$230_{M-1}$ is coupled to a respective one of the bank of synthesis filters $210_0$–$210_{M-1}$, and an output of each of the synthesis filters $210_0$–$210_{M-1}$ is coupled to a respective input of the reconstruction summing device 240. Output of the reconstruction summing device provides a reconstructed, full-band echo-canceled error signal.

In operation, the first bank of analysis filters $210_0$–$210_{M-1}$ splits the echo-containing signal (e.g., the microphone signal) into M (an integer) adjacent frequency bands, and the second bank of analysis filters $220_0$–$220_{M-1}$ splits the echo-causing or reference signal (e.g., the far-end speech signal) into the same M adjacent frequency bands. Conventionally, the overall bandwidth of interest is divided into M equal sub-bands, each sub-band having a bandwidth of 1/M times the overall bandwidth. Since the spectral content of each sub-band signal is limited as compared to the full-band signal, each sub-band signal can be decimated, or down-sampled, without loss of information. Accordingly, the first bank of decimators $215_0$–$215_{M-1}$ down-sample the echo-containing sub-band signals by a factor K, and the second bank of decimators $225_0$–$225_{M-1}$ down-sample the echo-causing sub-band signals by the same factor K in order to reduce computational complexity.

Thereafter, adaptive filter processing is carried out within each sub-band in a manner analogous to the above described full-band approach. Specifically, the sub-band adaptive filters $130_0$–$130_{M-1}$ filter the sub-band echo-causing signals to provide M sub-band echo estimates, and the resulting sub-band echo estimates are subtracted from the sub-band echo-containing signals (via the sub-band summing devices $120_0$–$120_{M-1}$) to provide M echo-canceled output signals. The sub-band echo-canceled output signals are used, in conjunction with the sub-band echo-containing signals, to update the sub-band adaptive filters $130_0$–$130_{M-1}$ as above (e.g., using an LMS or NLMS algorithm).

The expanders $230_0$–$230_{M-1}$ then interpolate, or up-sample, the sub-band echo-canceled signals by the factor K to return to the original sample rate, and the synthesis filters $235_0$–$235_{M-1}$M-1 filter the up-sampled, sub-band echo-canceled signals to cancel aliasing effects introduced by the down-sampling as is well known in the art. The bandwidths of the synthesis filters conventionally match those of the analysis filters (i.e., M equal bandwidths of 1/M times the overall bandwidth of interest). The resulting sub-band signals are then summed via the summing device 240 to produce, or reconstruct, the full-band echo-canceled signal (e.g., for transmission to the far-end user).

Those of skill in the art will appreciate that, although each filter block is shown operating in the time domain in FIG. 2, some or all of the filtering can be performed in the frequency domain as well (i.e., filtering by vector multiplication in the frequency domain is equivalent to filtering by sample-wise convolution in the time domain). Thus, the arrangement 200 of FIG. 2 can also include appropriate conversion processors as well (e.g., Fast Fourier Transform, or FFT, processors and Inverse Fast Fourier Transform, or IFFT, processors). Selection between time-domain and frequency domain filtering is a matter of design choice.

As described above, down-sampling of the sub-band signals improves computational efficiency. As is well known in the art, either critical down-sampling (i.e., down-sampling in which the factor K is equal to the number of sub-bands M) or non-critical down-sampling (i.e., where K is not equal to M) can be used. Critically-sampled systems have been studied extensively. See, for example, Andre Gilloire and Martin Vetterli, Adaptive Filtering in Sub-bands with Critical Sampling: Analysis, Experiments, and Application to Acoustic Echo Cancellation, IEEE Transactions on Signal Processing, Vol. 40, No. 8, Aug. 1992, pp. 1862–1875. While critically sampled systems do provide advantages over conventional, full-band adaptive filtering schemes, they require adaptive cross-filters between sub-band branches to completely eliminate aliasing effects.

Thus, emphasis has recently shifted toward non-critically sampled sub-band processing systems. For example, over-sampling (K<M) has been used to reduce aliasing effects without resort to adaptive cross-filters. However, such over-sampling can introduce other problems, including the occurrence of large spectral peaks in the sub-band error signals near the sub-band edges. See, for example, Phillip L. De Léon, II and Delores M. Etter, Experimental Results with Increased Bandwidth Analysis Filters in Oversampled, Sub-band Acoustic Echo Cancelers, IEEE Signal Processing Letters, Vol. 2, No. 1, January 1995pp. 1–3. In that article, the bandwidths of the analysis filters are increased with respect to the bandwidths of the synthesis filters. As a result, the convergence-slowing spectral peaks are shifted outward in frequency and removed by the synthesis filters. Consequently, overall adaptive filter convergence speed is improved.

By way of contrast, the present invention recognizes that aliasing at the sub-band edges in a non-critically sampled system can create significant drop-outs in the reconstructed signal, particularly where the echo-containing input signal is band-limited (as in the case of a microphone signal in a telephony application). Advantageously, the present invention teaches that such drop-outs can be reduced or eliminated by increasing the bandwidths of both the analysis filters and the synthesis filters in a non-critically sampled system.

In other words, the bandwidths of adjacent filters in the analysis filter banks, and the bandwidths of adjacent filters in the synthesis filter bank, can be made to overlap one another. For example, the bandwidth of each of M (an integer) filters in an analysis filter bank, and the bandwidth of each of M filters in a synthesis filter bank, can be made greater than 1/M times an overall bandwidth of interest BW. This is depicted in FIGS. 3A and 3B.

Figure 3A:
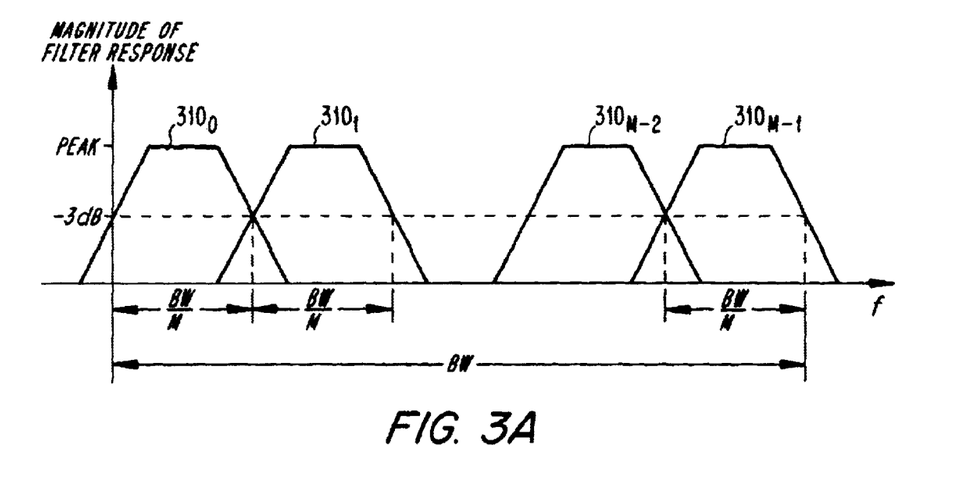
FIG. 3A is a spectral plot depicting the frequency response of a conventional sub-band adaptive filtering filter bank.
Figure 3B:
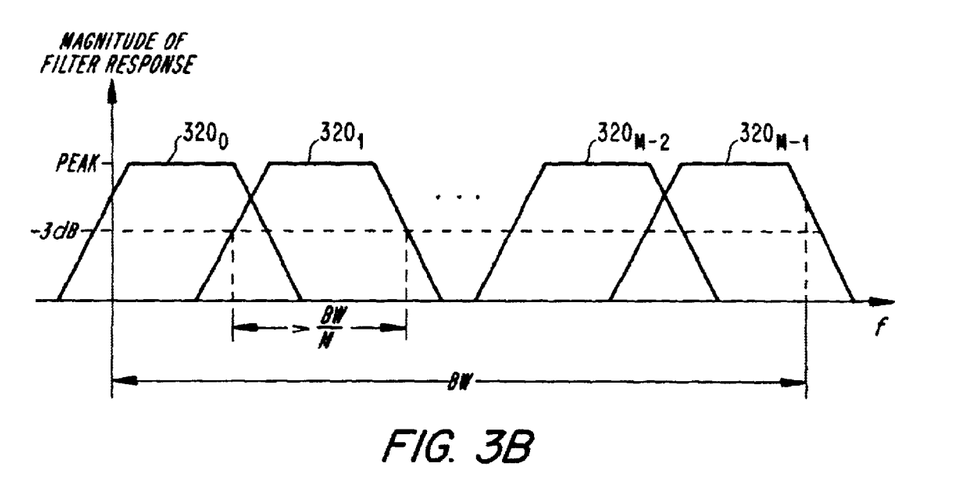
FIG. 3B is a spectral plot depicting the frequency response of a sub-band adaptive filtering filter bank according to the invention.

In FIG. 3A, the frequency response of a conventional analysis or synthesis filter bank is shown to include M bandpass regions $310_0$–$310_{M-1}$, each having a −3 dB bandwidth (i.e., a frequency passband extending from a lower −3dB cutoff frequency to an upper −3 dB cutoff frequency) equal to BW/M (where BW is an overall bandwidth of interest such as 30 Hz to 3 kHz for telephony applications). In FIG. 3B, on the other hand, the frequency response of an analysis or synthesis filter bank according to the invention is shown to include M bandpass regions $320_0$–$320_{M-1}$, each having a −3 dB bandwidth greater than BW/M. Thus, whereas adjacent filter responses in FIG. 3A are at exactly −3 dB (i.e., at one half peak value) at the filter response cross-over points, adjacent filter responses in FIG. 3B are above −3 dB at the cross-over points.

Figure 4A:
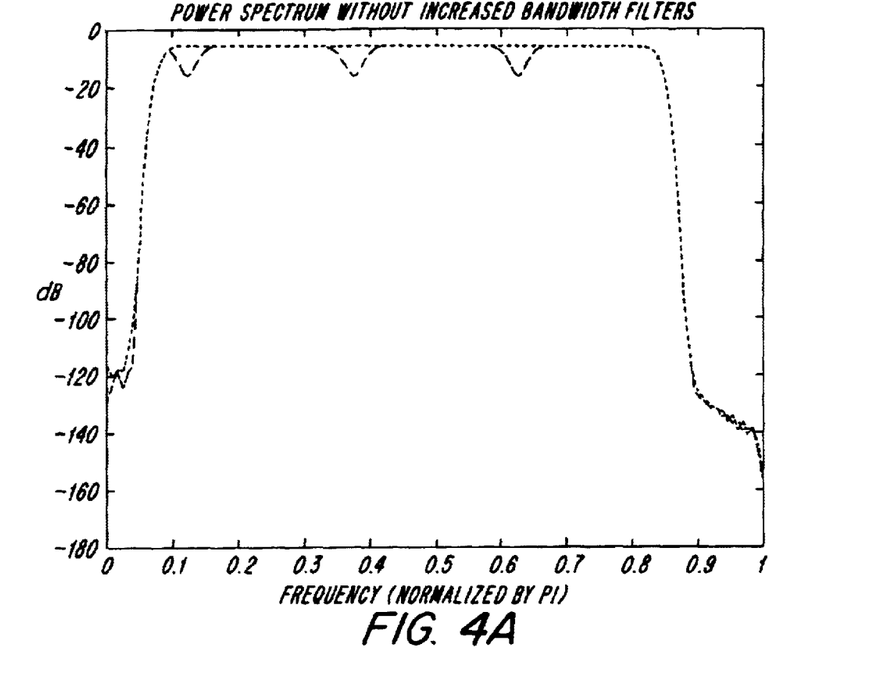
FIG. 4A is a spectral plot depicting a reconstructed echo-canceled signal obtained using conventional sub-band adaptive filtering techniques.
Figure 4B:
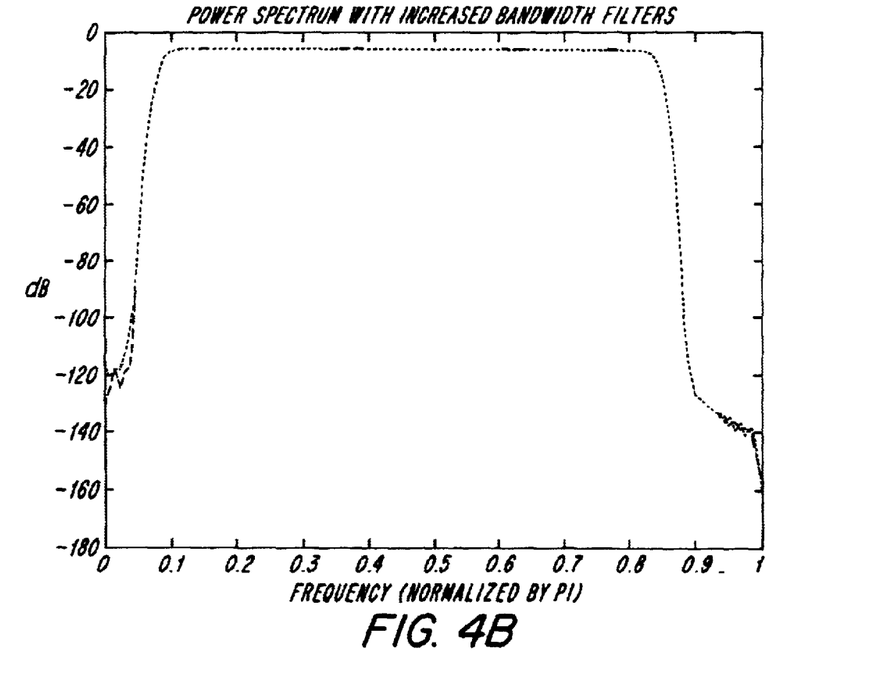
FIG. 4B is a spectral plot depicting a reconstructed echo-canceled signal obtained using sub-band adaptive filtering techniques according to the invention.

Experiments have shown that an overlap of 0.125–0.13 radians (on a frequency scale normalized by $\pi$) provides quality results in terms of output signal reconstruction. This is depicted in FIGS. 4A and 4B. In FIG. 4A, a reconstructed output signal obtained by conventional sub-band adaptive filtering (i.e., with non-overlapping adjacent filter bandwidths) is shown to include significant drop-outs as compared to an original input signal (the reconstructed and original signals are shown using a long-dashed line and a short-dashed line, respectively). In FIG. 4B, on the other hand, a reconstructed output signal obtained using sub-band adaptive filtering according to the invention (i.e., with overlapping adjacent filter bandwidths in the analysis and synthesis filter banks) is shown to be a close match to the same original input signal (as in FIG. 4A, the reconstructed and original signals are shown by a short-dashed line and a long-dashed line, respectively).

Those of skill in the art will appreciate that using M equal and overlapping −3 dB bandwidths to span an overall bandwidth of interest is merely exemplary and that the present invention encompasses any configuration in which adjacent −3db bandwidths are overlapping. For example, the overall bandwidth can be more finely partitioned within certain regions where a majority of signal power is expected, or the sub-band bandwidths can logarithmically increase from a lower bound of the overall bandwidth to an upper bound.

Generally, the invention provides sub-band adaptive filtering techniques wherein the bandwidth of each of a number of sub-band analysis filters, as well as the bandwidth of each of a number of synthesis filters, is increased as compared to the corresponding bandwidth in a conventional system. Specifically, adjacent −3dB bandwidths of sub-band filters in an analysis or synthesis filter bank according to the invention are designed to overlap one another. The increase in sub-band bandwidth tends to cancel aliasing effects resulting from down-sampling, and a sub-band adaptive filtering device according to the invention can therefore provide superior output signal reconstruction as compared to a conventional sub-band adaptive filtering device.

Those skilled in the art will appreciate that the present invention is not limited to the specific exemplary embodiments which have been described herein for purposes of illustration and that numerous alternative embodiments are also contemplated. For example, although the exemplary embodiments have been described with respect to acoustic echo cancelation in the context of hands-free telephony, the disclosed techniques are equally applicable to network echo cancelation (i.e., where echoes result from impedance mismatches at a hybrid junction between a digital device and an analog network) or to any signal processing application in which sub-band adaptive filtering is necessary or desirable. The scope of the invention is therefore defined by the claims appended hereto, rather than the foregoing description, and all equivalents consistent with the meaning of the claims are intended to be embraced therein.

We claim:

1. A communications device for providing bi-directional audio communications between a near-end user and a far-end user via a bidirectional communications channel, comprising:
   an adaptive echo canceler receiving a near-end audio signal and a far-end audio signal and providing an echo-canceled near-end audio signal for transmission to the far-end user via the communications channel,
   said adaptive echo canceler including a first bank of analysis filters for filtering the near-end audio signal, a second bank of analysis filters for filtering the far-end audio signal, and a bank of synthesis filters for filtering sub-band echo-canceled signals generated within said adaptive echo canceler,
   wherein a −3 dB bandwidth of a first of said synthesis filters and a −3 dB bandwidth of a second of said synthesis filters overlap in frequency.

2. A communications device according to claim 1, wherein a −3dB bandwidth of each of said synthesis filters overlaps in frequency a −3 dB bandwidth of at least one other of said synthesis filters.

3. A communications device according to claim 1,
   wherein said adaptive echo canceler includes an integer number M of synthesis filters,
   wherein −3 dB bandwidths of said M synthesis filters collectively span an overall bandwidth B,
   wherein a −3 dB bandwidth of one of said synthesis filters is centered at each one of M frequencies, the M frequencies being distributed across the overall bandwidth at intervals of B/M, and
   wherein the −3 dB bandwidth of each of said M synthesis filters is greater than B/M.

4. A communications device according to claim 3, wherein the −3 dB bandwidth of each of said synthesis filters is less than 2B/M.

5. A communications device according to claim 3, wherein the −3 dB bandwidth of each of said synthesis filters is greater than B/M by 0.125 to 0.3 radians on a normalized frequency scale.

6. A communications device according to claim 1, wherein a −3 dB bandwidth of a first analysis filter in said first bank of analysis filters and a −3 dB bandwidth of a second analysis filter in said first bank of analysis filters overlap in frequency, and wherein a −3 dB bandwidth of a first analysis filter in said second bank of analysis filters and a −3 dB bandwidth of a second analysis filter in said second bank of analysis filters overlap in frequency.

7. A communications device according to claim 6, wherein a −3 dB bandwidth of each analysis filter in said first bank of analysis filters overlaps in frequency a −3 dB bandwidth of at least one other analysis filter in said first bank of analysis filters, and wherein a −3 dB bandwidth of each analysis filter in said second bank of analysis filters overlaps in frequency a −3 dB bandwidth of at least one other analysis filter in said second bank of analysis filters.

8. A communications device according to claim 1,
wherein each of said first and second banks of analysis filters includes an integer number M of analysis filters,
wherein −3 dB bandwidths of the M analysis filters in each bank of analysis filters collectively span an overall bandwidth B,
wherein a −3 dB bandwidth of one analysis filter in each bank of analysis filters is centered at each one of M frequencies, the M frequencies being distributed across the overall bandwidth at intervals of B/M, and
wherein the −3 dB bandwidth of each of said M analysis filters in each bank of analysis filters is greater than B/M.

9. A communications device according to claim 8, wherein the −3 dB bandwidth of each of said analysis filters is less than 2B/M.

10. A communications device according to claim 8, wherein the −3 dB bandwidth of each of said analysis filters is greater than B/M by 0.125 to 0.3 radians on a normalized frequency scale.

11. A communications device according to claim 1, wherein sub-band signals output by each of said analysis filters is down-sampled.

12. A communications device according to claim 11, wherein each of said first and second banks of analysis filters includes an integer number M of analysis filters, and wherein each sub-band signal output by an analysis filter is down-sampled by a factor K less than M.

13. A method for adaptively filtering an echo-containing input signal to provide an echo-canceled output signal, the echo-containing input signal including an echo component resulting from transmission of an echo-causing signal through an echo path, comprising the steps of:
    passing the echo-containing signal through a first bank of analysis filters to provide a number of sub-band echo-containing signals,
    passing the echo-causing signal through a second bank of analysis filters to provide an equal number of sub-band echo-causing signals;
    passing the sub-band echo-causing signals through a bank of sub-band adaptive filters to provide sub-band echo estimates;
    subtracting each sub-band echo estimate from a respective one of the sub-band echo-containing signals to provide sub-band echo-canceled signals;
    passing the sub-band echo-canceled signals through a bank of synthesis filters to provide filtered sub-band echo-canceled signals, a −3 dB bandwidth of a first of said synthesis filters and a −3 dB bandwidth of a second of said synthesis filters overlapping in frequency; and
    combining the filtered sub-band echo-canceled signals to provide the echo-canceled output signal.

14. A method according to claim 13, wherein a −3 dB bandwidth of each of said synthesis filters overlaps in frequency a −3 dB bandwidth of at least one other of said synthesis filters.

15. A method according to claim 13,
wherein the bank of synthesis filters includes an integer number M of synthesis filters,
wherein −3 dB bandwidths of the M synthesis filters collectively span an overall bandwidth B,
wherein a −3 dB bandwidth of one of the synthesis filters is centered at each one of M frequencies, the M frequencies being distributed across the overall bandwidth at intervals of B/M, and
wherein the −3 dB bandwidth of each of the M synthesis filters is greater than B/M.

16. A method according to claim 15, wherein the −3 dB bandwidth of each of the synthesis filters is less than 2B/M.

17. A method according to claim 15, wherein the −3 dB bandwidth of each of the synthesis filters is 0. 125 to 0. 3 radians greater than HIM on a normalized frequency scale.

18. A method according to claim 13, wherein a −3 dB bandwidth of a first analysis filter in the first bank of analysis filters and a −3 dB bandwidth of a second analysis filter in the first bank of analysis filters overlap in frequency, and wherein a −3 dB bandwidth of a first analysis filter in the second bank of analysis filters and a −3 dB bandwidth of a second analysis filter in the second bank of analysis filters overlap in frequency.

19. A method according to claim 18, wherein a −3 dB bandwidth of each analysis filter in the first bank of analysis filters overlaps in frequency a −3 dB bandwidth of at least one other analysis filter in the first bank of analysis filters, and wherein a −3 dB bandwidth of each analysis filter in the second bank of analysis filters overlaps in frequency a −3 dB bandwidth of at least one other analysis filter in the second bank of analysis filters.

20. A method according to claim 13,
wherein each of the first and second banks of analysis filters includes an integer number M of analysis filters,
wherein −3 dB bandwidths of the M analysis filters in each bank of analysis filters collectively span an overall bandwidth B,
wherein a −3 dB bandwidth of one analysis filter in each bank of analysis filters is centered at each one of M frequencies, the M frequencies being distributed across the overall bandwidth at intervals of B/M, and
wherein the −3 dB bandwidth of each of the M analysis filters in each bank of analysis filters is greater than B/M.

21. A method according to claim 20, wherein the −3 dB bandwidth of each of the analysis filters is less than 2B/M.

22. A method according to claim 20, wherein the −3 dB bandwidth of each of the analysis filters is 0.125 to 0.3 radians greater than B/M on a normalized frequency scale.

23. A method according to claim 13, further comprising the steps of down-sampling the sub-band signals output by each of the analysis filters and up-sampling the sub-band signals input to each synthesis filters.

24. A method according to claim 23, wherein each bank of filters includes an integer number M of filters, and wherein the sub-band signals output by the analysis filters are down-sampled by a factor K less than M.

* * * * *

UNITED STATES PATENT AND TRADEMARK OFFICE
CERTIFICATE OF CORRECTION

PATENT NO.     : 6,628,781 B1
DATED          : September 30, 2003
INVENTOR(S)    : Patrik Grundstrom et al.

It is certified that error appears in the above-identified patent and that said Letters Patent is hereby corrected as shown below:

Column 10,
Line 16, change "BIM" to -- B/M --.

Signed and Sealed this

Thirtieth Day of December, 2003

JAMES E. ROGAN
*Director of the United States Patent and Trademark Office*